United States Patent [19]
Colwell

[11] Patent Number: 5,848,718
[45] Date of Patent: Dec. 15, 1998

[54] APPARATUS FOR FASTENING A HOUSING ASSEMBLY

[75] Inventor: Lawrence William Colwell, Elgin, Ill.

[73] Assignee: Motorola, Inc., Schaumburg, Ill.

[21] Appl. No.: 990,957

[22] Filed: Dec. 15, 1997

[51] Int. Cl.$^6$ ................................................. H02G 3/00
[52] U.S. Cl. ........................ 220/4.02; 220/3.94; 220/4.26
[58] Field of Search ................................ 220/4.02, 3.94, 220/4.21, 4.24, 4.25, 4.26

[56] References Cited

U.S. PATENT DOCUMENTS

| | | | |
|---|---|---|---|
| 2,057,116 | 10/1936 | Rubens | 220/3.94 X |
| 3,734,342 | 5/1973 | Patterson | 220/3.94 |
| 3,892,911 | 7/1975 | Codrino | 220/3.94 X |
| 4,090,632 | 5/1978 | Katzmann | 220/4.26 X |
| 4,240,688 | 12/1980 | Sotolongo | 220/3.94 X |
| 4,274,545 | 6/1981 | Peroni | 220/4.26 X |
| 5,526,929 | 6/1996 | Wei | 220/4.24 X |
| 5,531,345 | 7/1996 | Nakamura et al. | 220/4.24 X |

Primary Examiner—Steven M. Pollard
Attorney, Agent, or Firm—Paul J. Bartusiak

[57] ABSTRACT

A housing assembly comprises a plurality of components, each having a screw boss apparatus, such as screw boss (114). The screw boss apparatus has an interlocking tab and an interlocking slotted surface. In a preferred embodiment, the screw boss apparatus (114) has a first locking tab (202), a second locking tab (204), a first slotted surface (206), and a second slotted surface (208). The interlocking tab of one component is engaged to the interlocking slotted surface of another component to fasten components of a housing assembly together.

19 Claims, 5 Drawing Sheets

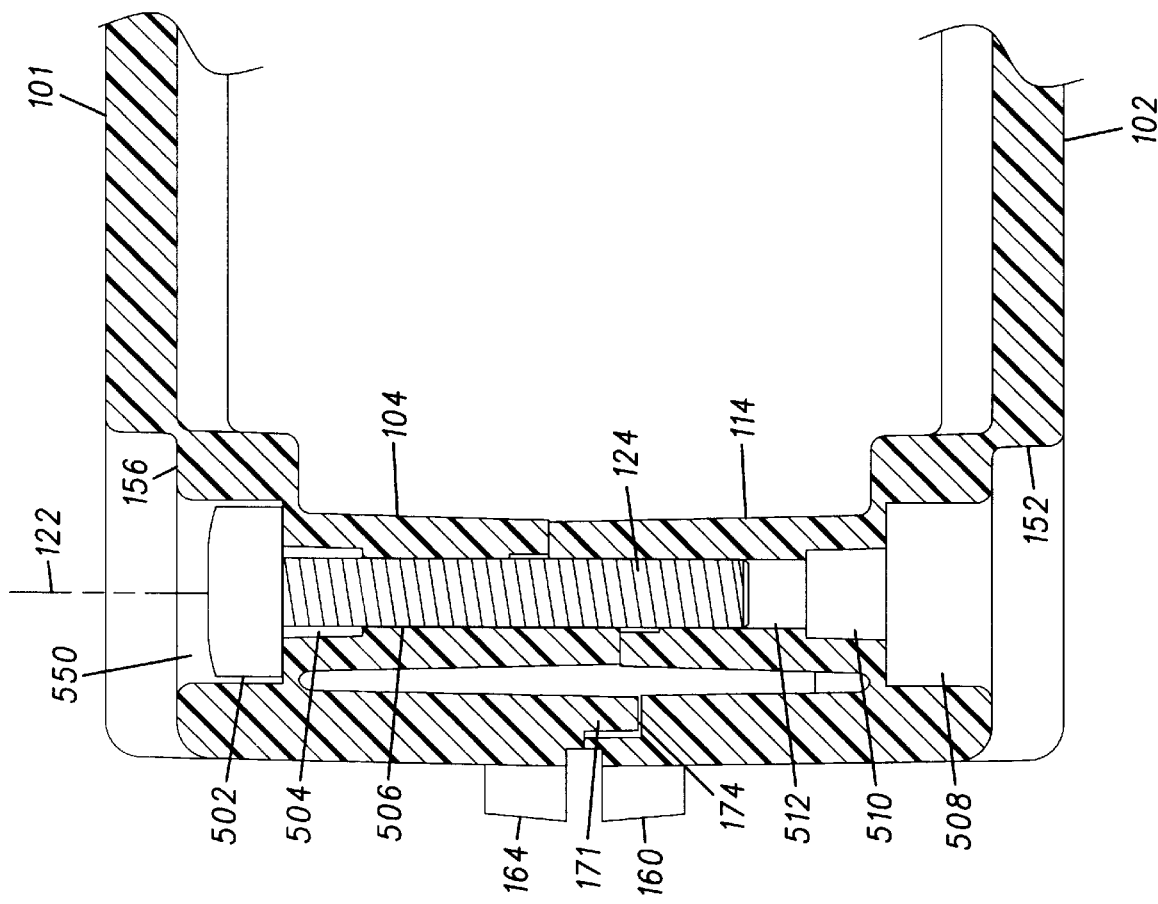

APPARATUS FOR FASTENING A HOUSING ASSEMBLY

FIELD OF THE INVENTION

This invention relates generally to housing assemblies, and more particularly to an apparatus for fastening housing assemblies.

BACKGROUND OF THE INVENTION

Electronic circuitry, such as circuit boards, wires, and connectors, is typically contained within a housing assembly. An example of the use of a housing assembly is a housing assembly containing circuitry which is then mounted in an automobile to allow hands free operation of a radiotelephone. A speaker and microphone are attached to the car-mounted electronic housing assembly, and the electronic housing assembly is then connected to the radiotelephone.

The screw boss design that is used to fasten together components comprising the housing assembly is different for the different components of the housing assembly. For example, in a housing assembly comprising two components, a first component screw boss, or screw hole, is unthreaded and larger in diameter than the diameter of the retaining screw. This allows the screw to slide through the assembly without any threading. The second component screw boss, or second screw hole, is threaded. When the screw is inserted through the first screw boss and reaches the second screw boss, threading action in the second component begins, and the two components are fastened by completely threading the screw through the second component screw boss.

Having two separate components of the housing assembly with two different boss designs limits the assembly of the unit by forcing the screw to be insertable in only one direction. For example, if the screw is first threaded through the component containing the threaded screw boss, there is no way for the screw to attach to the component containing the unthreaded screw boss. This adds to assembly complexity. Another disadvantage of the conventional screw boss design is increased manufacturing cost because different specialized components must be used for the assembly of the housing.

If identical components containing the conventional boss design are used, a fastening problem occurs. The screw is first screwed into a screw hole of the first assembly. As the screw reaches the second assembly, the force of the screw causes the two assemblies to separate. The resulting gap between the two assemblies makes fastening the two components together very difficult.

Accordingly, there is a need for a screw boss design for housing assemblies which results in identical separate components having screw bosses in all of the components. There is a further need for a screw boss design that allows retaining screws to be first inserted in either of the components of a housing assembly.

BRIEF DESCRIPTION OF THE DRAWINGS

FIG. 5 is a cross-sectional view of the portion of the housing assembly of FIG. 4.

DETAILED DESCRIPTION OF A PREFERRED EMBODIMENT

The present invention advantageously provides an apparatus for fastening the components of a housing assembly together. The screw boss apparatus advantageously allows retaining screws to be first inserted through any component of the housing assembly. The screw boss design further simplifies assembly since components of the housing assembly can be identical. Further, the manufacturing cost of the housing assembly is significantly reduced since the components of the housing assembly can be identical, and specialized assembly operations are eliminated.

Figure 1:
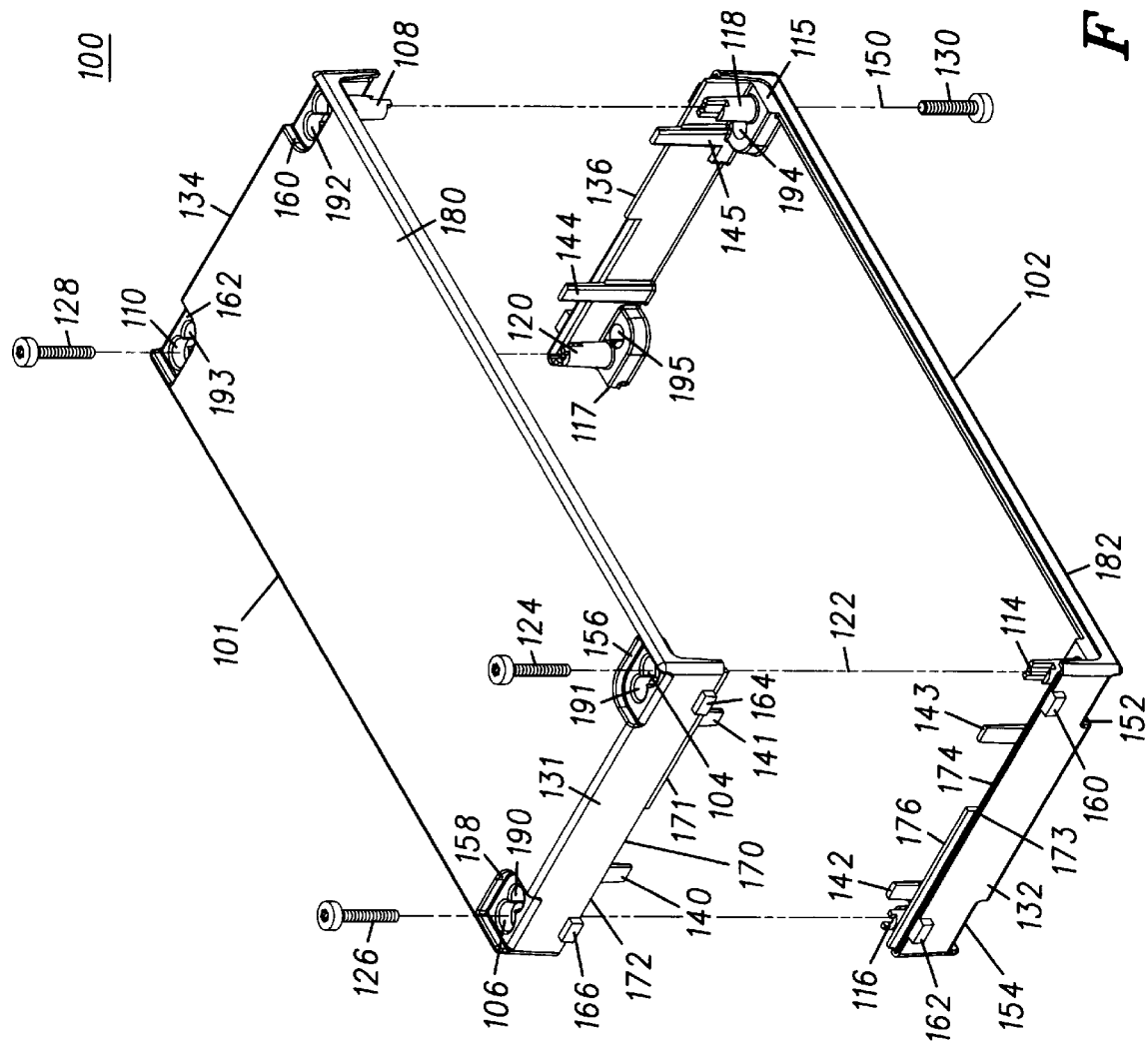
FIG. 1 is a housing assembly having two separate components wherein each component has screw bosses according to the present invention.

Turning first to FIG. 1, a housing assembly 100 having two generally identical, separate components is shown as first component 101 and second component 102. Each component has a plurality of generally identical screw bosses, shown here as screw bosses 104, 106, 108, and 110 of the first component 101 and 114, 116, 118, and 120 of the second component 102. The housing assembly components are preferably formed of a plastic material. Further, the components of the housing assembly of the preferred embodiment are fabricated using injection molding technology. In alternate embodiments, the housing assembly comprises more than two components or non-identical components.

A first outer surface 180 of first component 101 is formed to define a recessed area in each corner of the first outer surface 180. Recessed area 156 locates second screw boss 104, recessed area 158 locates screw boss 106, recessed area 160 locates screw boss 108, and recessed area 162 locates screw boss 110.

A second outer surface 182 of second component 102 is formed to define a recessed area in each corner of the second outer surface 182. Recessed area 152 locates first screw boss 114, recessed area 154 locates screw boss 116, recessed area 115 locates screw boss 118, and recessed area 117 locates screw boss 120.

The second component 102 comprises a first side 132 and a second side 136. First side 132 comprises alignment tabs, shown here as first alignment tab 160 and second alignment tab 162. A first portion 174 of an edge 173 of first side 132 is formed to define a mating recess, and a second portion 176 of the edge 173 of first side 132 is formed to define a mating ridge. The second side 136 is configured substantially the same as first side 132.

The first component 101 comprises a third side 131 and a fourth side 134. Third side 131 comprises alignment tabs, shown here as third alignment tab 164 and fourth alignment tab 166. A third portion 171 of an edge 170 of third side 131 is formed to define a mating ridge, and a fourth portion 172 of the edge 170 of third side 131 is formed to define a mating recess. The fourth side 134 is configured substantially the same as the third side 132.

The first component 101 and second component 102 are designed to join edge 173 of the first side 132 of second component 102 to edge 170 of the third side 131 of first component 101. First alignment tab 160 and second alignment tab 162 of the first side 132 are aligned with the third alignment tab 164 and the fourth alignment tab 166, respectively, of the third side 131. In addition, the first portion 174 of edge 173 is mated to the third portion 171 of edge 170, and the second portion 176 of edge 173 is mated to the fourth portion 172 of edge 170. The second side 136 of second component 102 is joined to fourth side 134 of the first component 101 in substantially the same fashion. In this manner, the first component 101 and the second component 102 interlock and remain engaged. Alignment tabs 160, 162, 164, and 166 can also be used as fastening tabs for fastening extra components to the housing assembly.

Retaining screws are then inserted in each of the screw bosses to fasten the two components together to form an enclosure. In the illustrated embodiment, retaining screws 124, 126, and 128 are first threaded through the first component 101 and then threaded through second component 102. In the preferred embodiment, the retaining screws comprise self-tapping retaining screws. Similarly, retaining screw 130 is first threaded through second component 102 and then threaded through first component 101. Since first component 101 and second component 102 are substantially identical, each of the plurality of retaining screws can be threaded first through either of the components. For example, retaining screw 124 is shown to be insertable through first component 101 in a direction along an axis 122. The retaining screw 124 is also insertable through second component 102 in an opposite direction along the axis 122. Likewise, retaining screw 130 is shown to be insertable through second component 102 in a direction along an axis 150.

The retaining screw 130 is also insertable through first component 101 in an opposite direction along the axis 150.

Since the first component 101 and the second component 102 are substantially identical, first component 101 could be rotated relative to the second component 102 before mating the components together so that first side 132 of the second component 102 mates with fourth side 134 of the first component 101 and the second side 136 of the second component 102 mates with the third side 131 of the first component 101.

The housing assembly components are also formed to define mounting holes, shown in FIG. 1 as mounting hole 190, mounting hole 191, mounting hole 192, mounting hole 193, mounting hole 194, and mounting hole 195, which are located adjacent to each screw boss, for inserting mounting screws to mount the housing assembly. The mounting holes of the first component 101 are aligned along the same axis as the mounting holes of the second component 102 so that a mounting screw is insertable through both components. In addition, printed circuit board (PCB) tabs, shown in FIG. 1 as PCB tabs 140, 141, 142, 143, 144, and 145, are located in pairs at each side of each housing assembly component. The PCB tabs are used to hold the PCB board in place by making cut-outs in the PCB board to fit around the PCB tabs.

Figure 2:
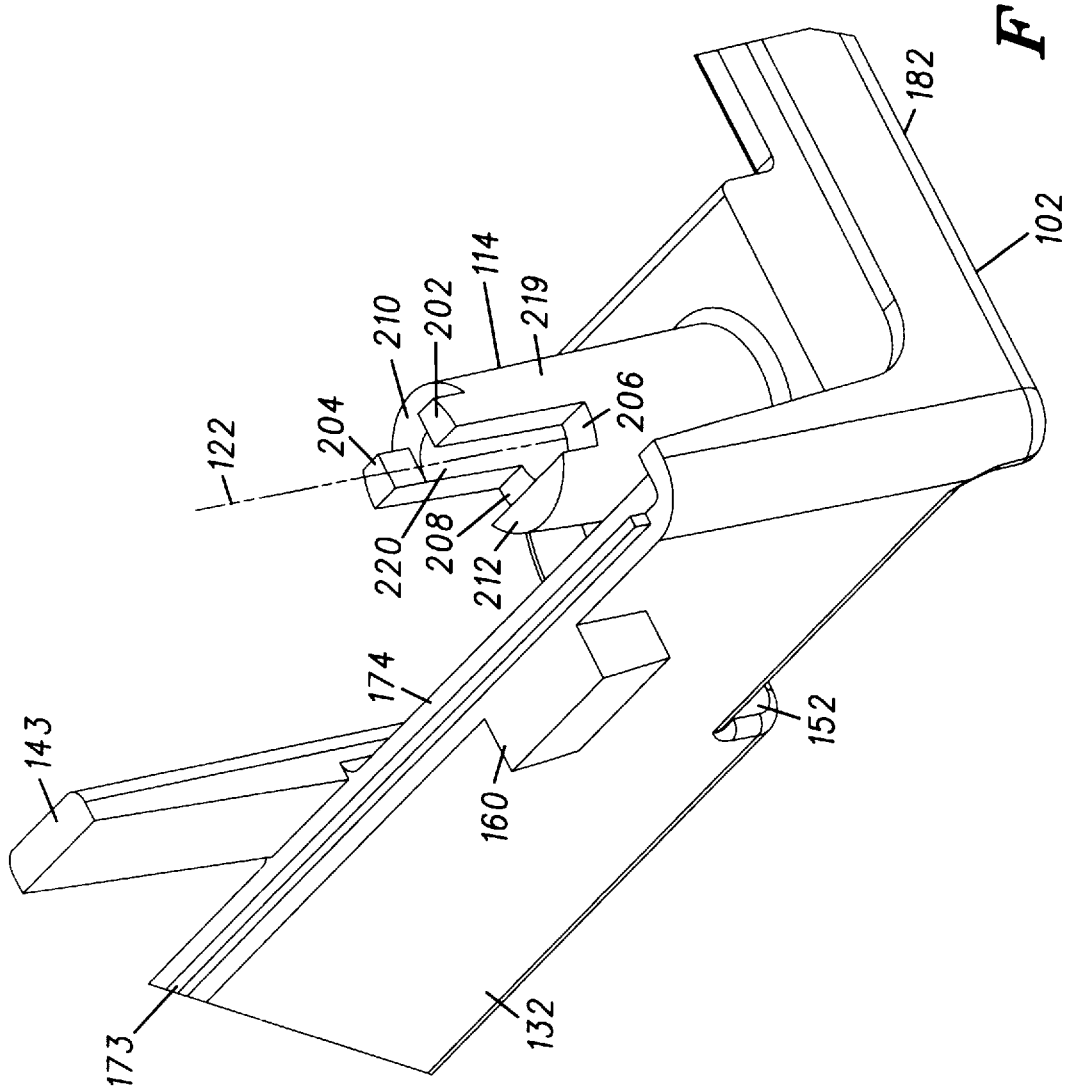
FIG. 2 is a detailed view of a portion of the housing assembly of FIG. 1.

FIG. 2 is a detailed view of a portion of second component 102 of the housing assembly 100. First screw boss 114 exemplifies the design of all screw bosses of the illustrated embodiment. First screw boss 114 generally is formed to define a cylinder in a direction along an axis 122. First screw boss 114 has an outer surface 219 and an inner surface 220. An end 210 of the first screw boss 114 is formed to define a first locking tab 202 and a second locking tab 204 which extends parallel to the first locking tab 202. Both locking tabs protrude from end 210. The first locking tab 202 and the second locking tab 204 can generally be referred to as an interlocking tab. A flat recessed portion 212 is defined on end 210 and is disposed in opposing relation to first locking tab 202 and second locking tab 204 so that a first slotted surface 206 and a second slotted surface 208 is formed. First slotted surface 206 and second slotted surface 208 is generally referred to as an interlocking slotted surface. Thus, the first screw boss 114 can comprise a plurality of first screw boss slotted surfaces. Similarly, the second screw boss 104 (FIG. 1) can comprise a plurality of second screw boss slotted surfaces.

Figure 3:
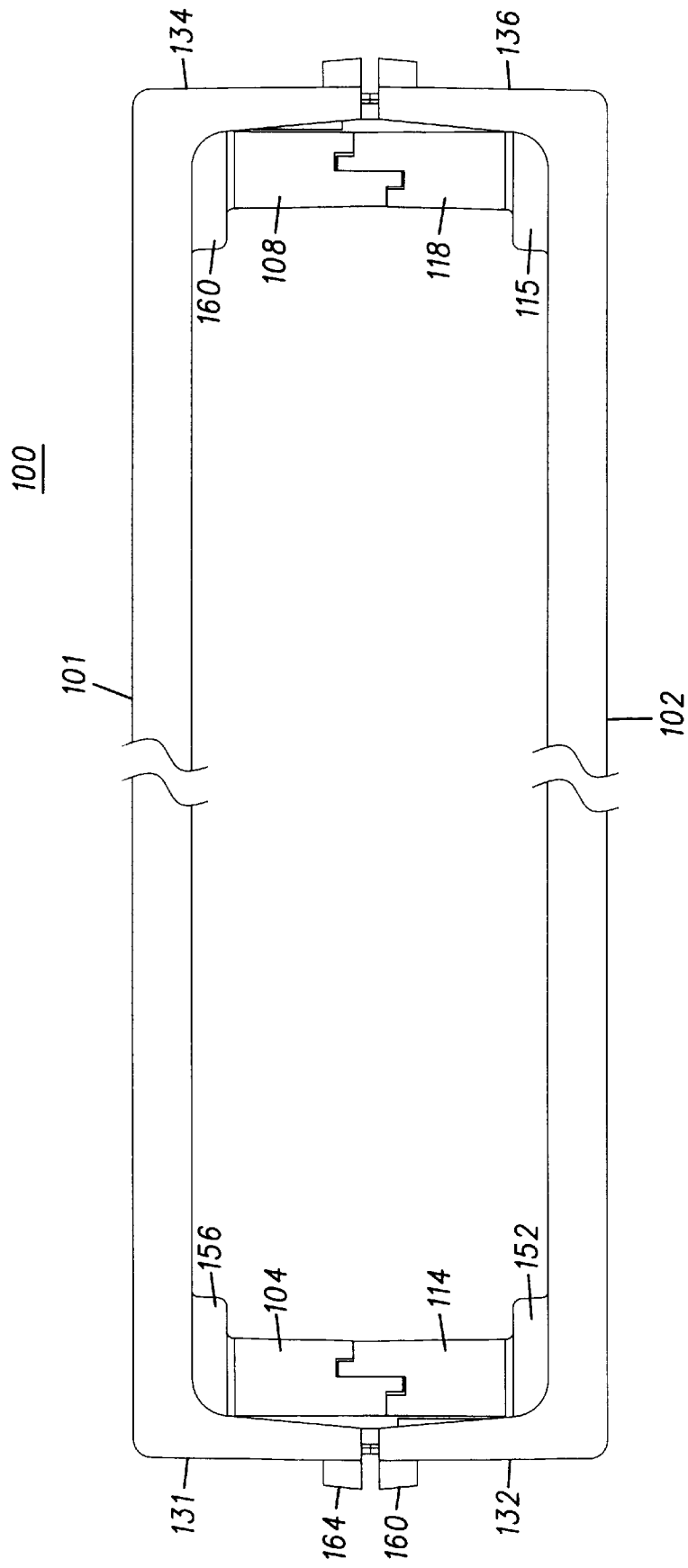
FIG. 3 is a drawing of the housing assembly of FIG. 1 wherein the components are fastened together according to the present invention.

FIG. 3 is a drawing of the housing assembly 100 wherein the components are fastened together according to the present invention. Side 132 of the second component 102 is mated to the side 131 of the first component 101, and the side 136 of the second component 102 is mated to the side 134 of the first component 101. Since both components are identical, side 132 of second component 102 could be mated to side 134 of first component 101, and side 136 would then mate to side 131. In the illustrated embodiment, first screw boss 114 mates with second screw boss 104, and screw boss 118 is shown to mate with screw boss 108. Screw boss 116 mates with screw boss 106, and screw boss 120 mates with screw boss 110.

Figure 4:
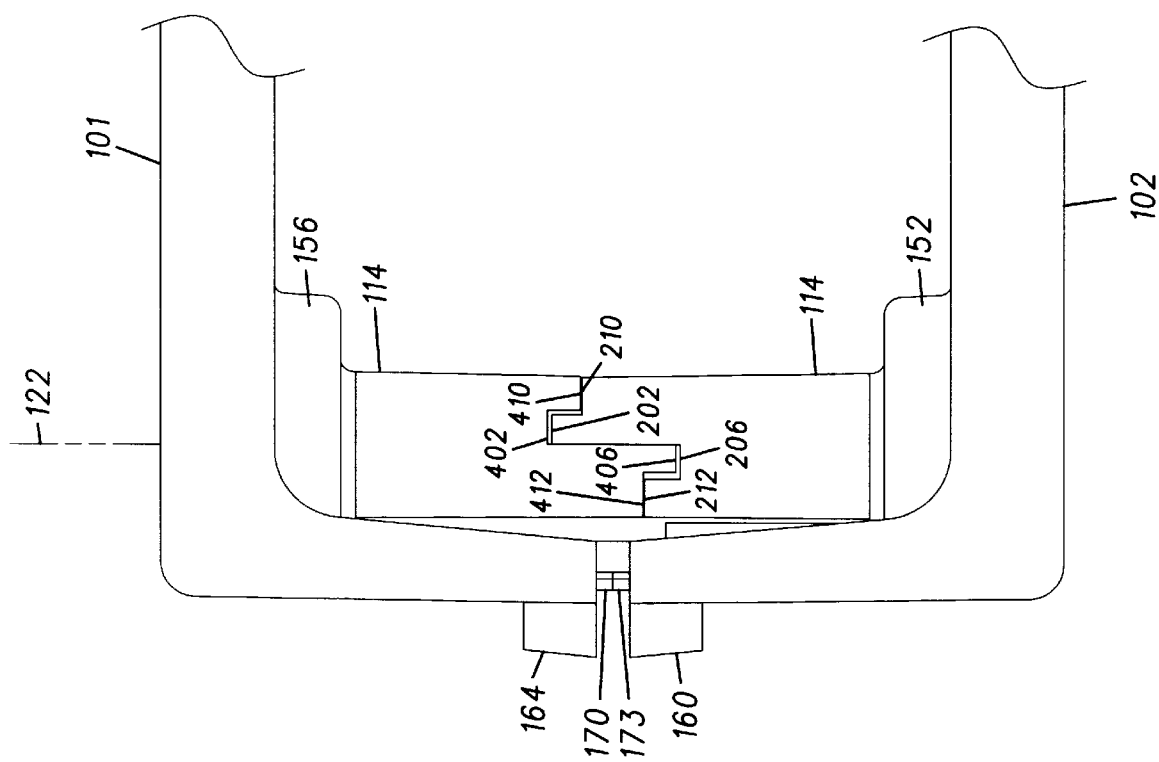
FIG. 4 is a detailed drawing of a portion of the housing assembly of FIG. 3.

FIG. 4 illustrates a portion of the mated housing assembly 100. In the illustrated embodiment, first screw boss 114 is mated to second screw boss 104. End 210, first locking tab 202, and second locking tab 204 protrude in a direction along the axis 122 beyond edge 173. In addition, flat portion 212, first slotted surface 206, and second slotted surface 208 are recessed in an opposite direction along the axis 122 below edge 173. The first end 210 of the first screw boss 114 abuts the flat portion 410 of second screw boss 104, first locking tab 202 of first screw boss 114 engages a first slotted surface 402 of second screw boss 104, first slotted surface 206 of first screw boss 114 engages first locking tab 406 of second screw boss 104, and the end 412 of the second screw boss 104 abuts the flat portion 212 of first screw boss 114. In the same fashion, second locking tab 204 of first screw boss 114 engages a second slotted surface of second screw boss 104 and a second slotted surface 208 of first screw boss 114 engages a second locking tab of second screw boss 104.

With first screw boss 114 engaged to second screw boss 104, a retaining screw is threaded into the mated components. The retaining screw can be threaded first through the first component 101 in a direction along the axis 122. The retaining screw 124 can also be threaded first through the second component 102 in an opposite direction along the axis 122. The engaging of the tabs and slotted surfaces prevents axial separation of the two components while the retaining screw is being threaded through the two components.

FIG. 5 is a cross-sectional view of the portion of the housing assembly 100 shown in FIG. 4. First screw boss 114 is formed to define a hollow cylinder 550, and the hollow cylinder 550 includes first cylinder portion 508, second cylinder portion 510, and third cylinder portion 512. In the illustrated embodiment, the different cylinder portions of the screw boss have different diameters. The first cylinder portion 508 diameter is sized to receive a retaining screw so that the retaining screw can be counter-sunk. The second cylinder portion 510 is sized to receive a retaining screw for guiding the screw. The third cylinder portion 512 is sized for engaging threads of the retaining screw. All screw bosses of the illustrated embodiment are substantially identical to the first screw boss 114. For example, second screw boss 104 is formed to define a hollow cylinder 550 that includes a first cylinder portion 502, a second cylinder portion 504, and a third cylinder portion 506.

FIG. 5 also shows the mating ridge of the third portion 171 of edge 170 abutting the mating recess of the first portion 174 of edge 173.

The apparatus for a housing assembly in accordance with the present invention has several advantages over previous screw bosses used for housing assemblies. The apparatus allows retaining screws to be inserted in any of the components first, which simplifies the assembly process and therefore reduces cost. Further, the apparatus allows the components of the housing assembly to be identical, thereby greatly simplifying the assembly process and reducing cost. In addition, since the components of the housing assembly can be identical, the manufacturing cost is significantly reduced.

The previous description of the preferred embodiments are provided to enable any person skilled in the art to make or use screw boss apparatus. Various modifications to these embodiments will be readily apparent to those skilled in the art, and the generic principles defined herein may be applied to other embodiments without the use of the inventive faculty.

What is claimed is:

1. An apparatus for fastening a housing assembly comprising:
    a first component having a first screw boss formed to define a first cylinder having an outer surface and an inner surface, the first screw boss having a first end and a second end;
    the first end of first screw boss formed to define an interlocking tab that protrudes from a portion of the first end of the first screw boss, the first end of the first screw boss having a flat recessed portion that is located opposite the interlocking tab of the first screw boss to form an interlocking slotted surface of the first screw boss;
    a second component having a second screw boss formed to define a second cylinder having an outer surface and an inner surface, the second screw boss having a first end and a second end; and
    the first end of the second screw boss formed to define an interlocking tab of the second screw boss that protrudes from a portion of the first end of the second screw boss, the first end of the second screw boss having a flat recessed portion that is located opposite the interlocking tab of the second screw boss to form an interlocking slotted surface;
    wherein the first end of the first screw boss abuts the flat recessed portion of the second screw boss, the interlocking tab of the first screw boss engages the interlocking slotted surface of the second screw boss, the interlocking tab of the second screw boss engages the interlocking slotted surface of the first screw boss, and the first end of the second screw boss abuts the flat recessed portion of the first screw boss for engaging the first and second components.

2. The apparatus as in claim 1, wherein the first component having the first screw boss and the second component having the second screw boss are substantially identical.

3. The apparatus as in claim 1, further comprising a retaining screw insertable in the second end of each of the first screw boss and the second screw boss for engaging the first screw boss and the second screw boss.

4. The apparatus as in claim 3, wherein:
    the interlocking tab of the first screw boss comprises a plurality of first screw boss locking tabs and the interlocking slotted surface of first screw boss is formed to define a plurality of first screw boss slotted surfaces; and
    the interlocking tab of the second screw boss comprises a plurality of second screw boss locking tabs and the interlocking slotted surface of second screw boss is formed to define a plurality of second screw boss slotted surfaces;
    wherein the plurality of first screw boss locking tabs engages the plurality of second screw boss slotted surfaces and the plurality of second screw boss locking tabs engages the plurality of first screw boss slotted surfaces for engaging the first and second components.

5. The apparatus as in claim 4, wherein the first component and the second component are formed of a plastic material.

6. The apparatus as in claim 5, wherein the first component and the second component are fabricated using injection molding technology.

7. The apparatus in claim 1, wherein the first component is formed to define a first component mounting hole oriented along an axis and the second component is formed to define a second component mounting hole oriented on the axis so that a mounting screw is insertable through the first and second components.

8. The apparatus as in claim 1, wherein the first and second cylinders each includes a first cylinder portion, a second cylinder portion, and a third cylinder portion, wherein the first cylinder portion is sized to receive a retaining screw so that the retaining screw can be counter-sunk, the second cylinder portion is sized to receive the retaining screw for guiding the retaining screw, and the third cylinder portion is sized for engaging threads of the retaining screw.

9. An apparatus for fastening a housing assembly comprising:
    a plurality of components, each of the plurality of components having a screw boss;
    the screw boss formed to define a cylinder having an outer surface and an inner surface and having a first end and a second end; and
    the first end formed to define an interlocking tab that protrudes from a portion of the first end and a flat recessed portion that is located opposite the interlocking tab to form an interlocking slotted surface;
    wherein the first end of the screw boss abuts the flat recessed portion of another screw boss and the interlocking tab of the screw boss engages the interlocking slotted surface of the other screw boss.

10. The apparatus as in claim 9, wherein each of the plurality of components is substantially identical.

11. The apparatus as in claim 10, further comprising a retaining screw insertable in the second end of the screw boss.

12. The apparatus as in claim 11, wherein each of the plurality of components is formed of a plastic material.

13. The apparatus as in claim 12, wherein each of the plurality of components are fabricated using injection molding technology.

14. The apparatus as in claim 9, wherein each of the plurality of components is formed to define mounting holes.

15. The apparatus as in claim 9, wherein the cylinder includes a first cylinder portion, a second cylinder portion, and a third cylinder portion, wherein the first cylinder portion is sized to receive a retaining screw so that the retaining screw can be counter-sunk, the second cylinder portion is sized to receive the retaining screw for guiding the retaining screw, and the third cylinder portion is sized for engaging threads of the retaining screw.

16. The apparatus as in claim 9, wherein:
    the interlocking tab comprises a plurality of locking tabs; and the interlocking slotted surface comprises a plurality of screw boss slotted surfaces.

17. The apparatus as in claim 9, wherein the plurality of components are fabricated using injection molding technology.

18. The apparatus as in claim 9, wherein each of the plurality of components is substantially identical.

19. The apparatus as in claim 9, wherein each of the plurality of components comprises a plurality of screw bosses, each screw boss of one of the plurality of components is oriented along a same axis as the screw boss of another of the plurality of components.

* * * * *